United States Patent [19]

Pakosh

[11] Patent Number: 4,572,215
[45] Date of Patent: Feb. 25, 1986

[54] SPLITTER BLADE FOR THRESHING ROTOR

[75] Inventor: Daniel Pakosh, Winnipeg, Canada

[73] Assignee: Versatile Corporation, British Columbia, Canada

[21] Appl. No.: 445,668

[22] Filed: Nov. 30, 1982

[30] Foreign Application Priority Data

Dec. 3, 1981 [CA] Canada ................................. 391425

[51] Int. Cl.[4] ............................................. A01F 12/18
[52] U.S. Cl. ................................. 130/27 R; 56/14.6
[58] Field of Search ..... 130/27 HA, DIG. 1, DIG. 2, 130/27 R, 27 G, 27 H, 27 J, 27 K, 27 P, 27 Q, 27 T; 56/14.6; 198/601

[56] References Cited

U.S. PATENT DOCUMENTS

| | | | |
|---|---|---|---|
| 1,729,199 | 9/1929 | Wood | 130/DIG. 1 |
| 3,296,782 | 1/1967 | Mark et al. | 56/14.6 |
| 3,430,633 | 4/1969 | Mark | 130/27 R |
| 3,794,046 | 2/1974 | Muijs | 56/14.6 |
| 4,117,849 | 10/1978 | Pakosh | |
| 4,310,005 | 1/1982 | DeBusscher et al. | 130/27 R |

FOREIGN PATENT DOCUMENTS 2057240  4/1981  United Kingdom ............. 130/27 T

*Primary Examiner*—Paul J. Hirsch
*Assistant Examiner*—John G. Weiss
*Attorney, Agent, or Firm*—John R. Uren

[57] ABSTRACT

A series of cutting knives for a threshing assembly which comprises a rotor within a cage. The assembly is mounted substantially transversely to the longitudinal axis of the combine and crop is fed into the central feed area. The knives sever the crop at the centrally located feed area and the crop is thereby split. After reaching the top of the cage, crop is conveyed to each respective end of the assembly as it travels around the inside of the cage by helical guide vanes mounted on the upper portion of the cage periphery.

6 Claims, 5 Drawing Figures

SPLITTER BLADE FOR THRESHING ROTOR

INTRODUCTION

This application relates to cutting means located on the rotor of the threshing assembly of a combine harvester.

BACKGROUND OF THE INVENTION

In our U.S. Pat. No. 4,117,849 (Pakosh) and our co-pending U.S. Pat. application Ser. No. 178,014 filed Aug. 13, 1980 (Pakosh), there is disclosed a combine harvester in which the threshing assembly receiving the crop is mounted substantially transversely to the longitudinal axis of the combine. In an embodiment there described, crop is introduced to the transversely located threshing assembly through a centrally located feed area where it is then split by helical guide vanes after reaching the upper portion of the cage. The guide vanes are located on the inside of the cage periphery. Thereafter, the crop is conveyed to respective ends of the assembly.

Such combines as described in the aforementioned patent and application are large capacity combines and are designed to process large volumes of crop at increased combine speeds. Accordingly, while prior combines did not require the crop to be split, such crop splitting allows an increase in processing speed particularly when the threshing assembly is itself designed for more capacity and when crop being cut is green or wet.

To accomplish crop splitting, the aforementioned helical guide vanes have been used. The use of the helical guide vanes by themselves, however, can be improved by also providing a cutting means. While previously, the crop may have been split solely by the action of the guide vanes, such splitting has resulted in some "bunching" of the crop at the central feed area under adverse crop conditions. This is so because the guide vanes on the left of the assembly act to urge the crop to the left and those on the right of the assembly act to urge the crop to the right.

SUMMARY OF THE INVENTION

According to the invention, there is disclosed a threshing assembly for a combine harvester, said assembly comprising a substantially cylindrical housing, a substantially cylindrical rotor rotatable within said housing, a crop feed area located centrally of said threshing assembly to receive crop, guide means on the upper inside periphery of said housing to guide said crop to respective opposite sides of said threshing assembly, threshing means on said rotor operable to thresh said crop, said threshing means comprising a plurality of rasp bars running continuously for substantially the length of said rotor and parallel to the axis of said rotor, said rasp bars being spaced substantially equidistant and intermittently about the periphery of said rotor, and cutting means centrally located on said rotor adjacent said rasp bars and operable to sever said crop at said crop feed area.

BRIEF DESCRIPTION OF THE SEVERAL VIEWS OF THE DRAWINGS

An embodiment of the invention will now be described, by way of example only, with reference to the accompanying drawings in which.

DESCRIPTION OF SPECIFIC EMBODIMENT

Figure 1:
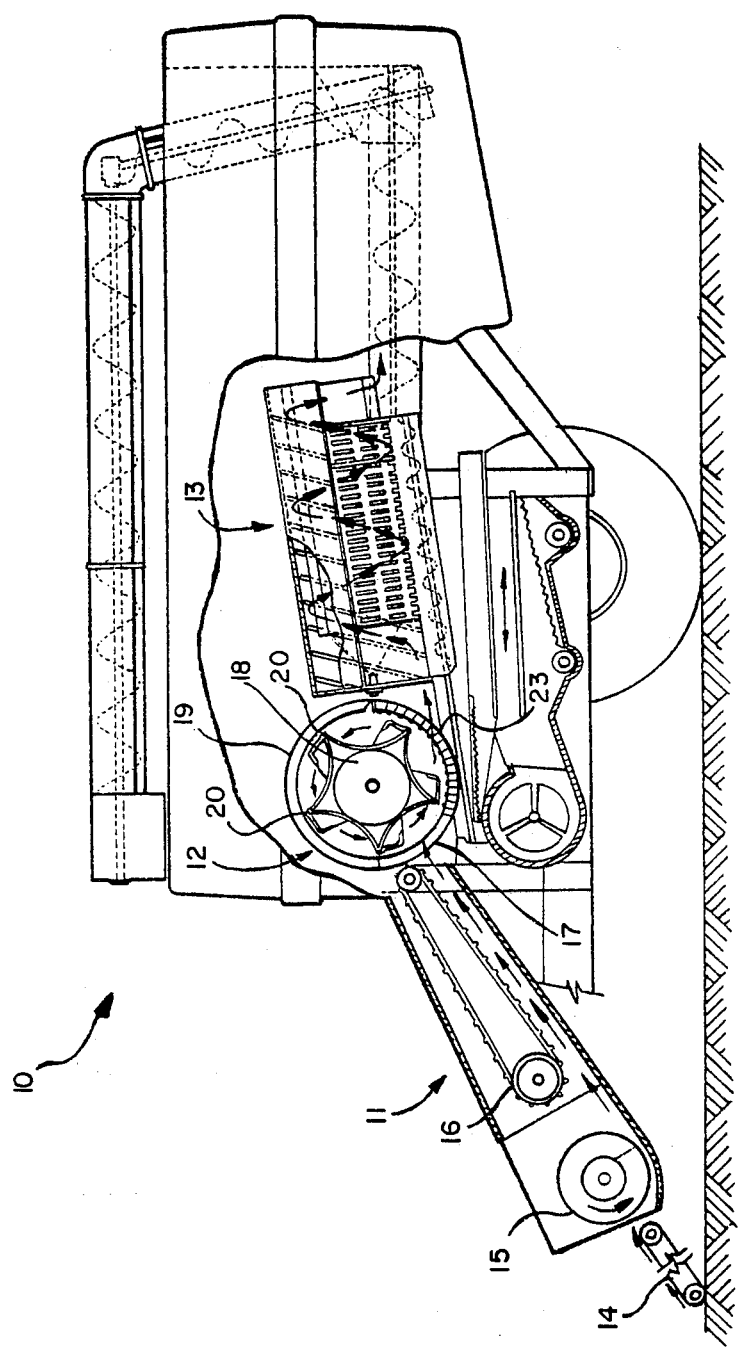
FIG. 1 is a side view of a combine harvester.

Referring now to the drawings, a combine harvester is shown generally at 10 in FIG. 1. The combine harvester 10 comprises a crop feeding means 11, a threshing assembly shown generally at 12 and a separating area shown generally at 13.

The crop feeding means 11 includes a crop pickup 14 and a table auger 15 which act to pickup crop and convey it to feeder elevator 16. Feeder elevator 16 feeds the crop to the threshing assembly 12.

Figure 2:
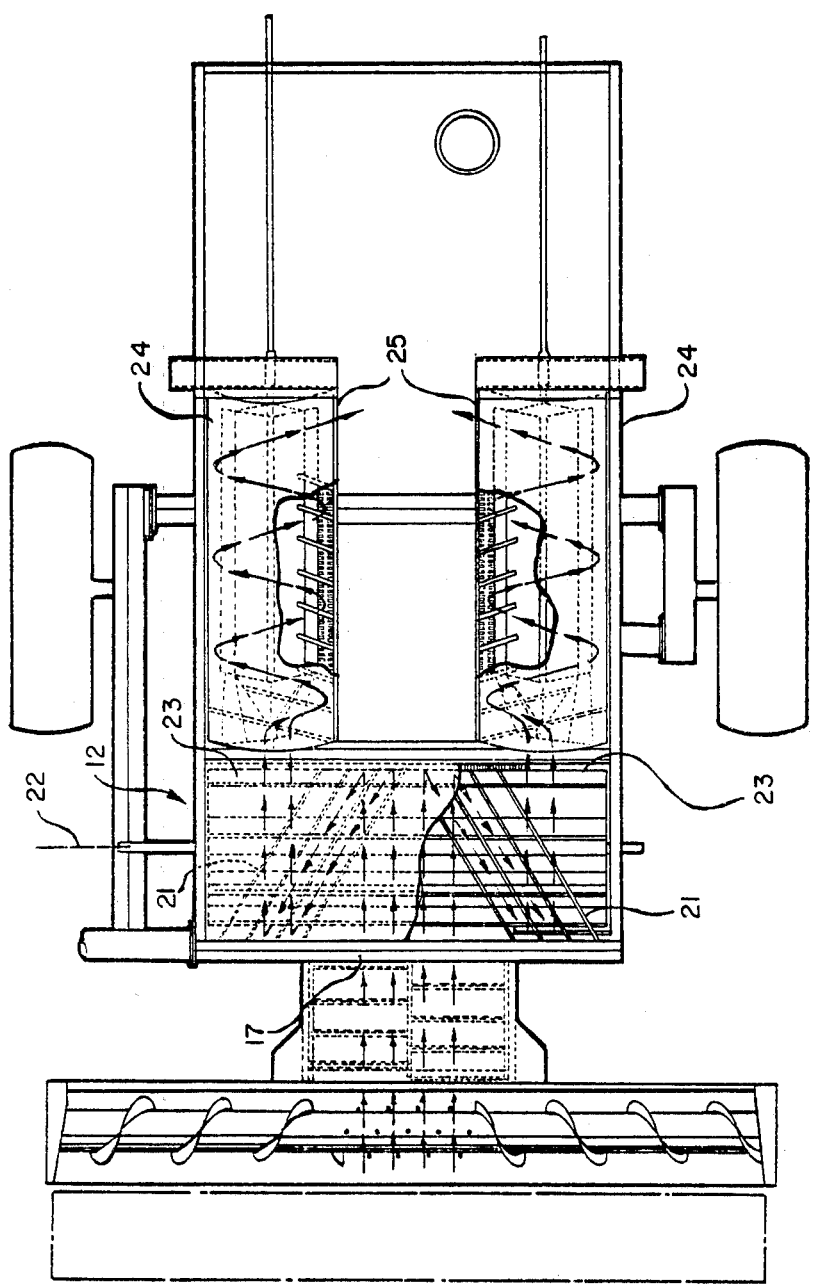
FIG. 2 is a plan view of the combine harvester of FIG. 1.
Figure 3A:
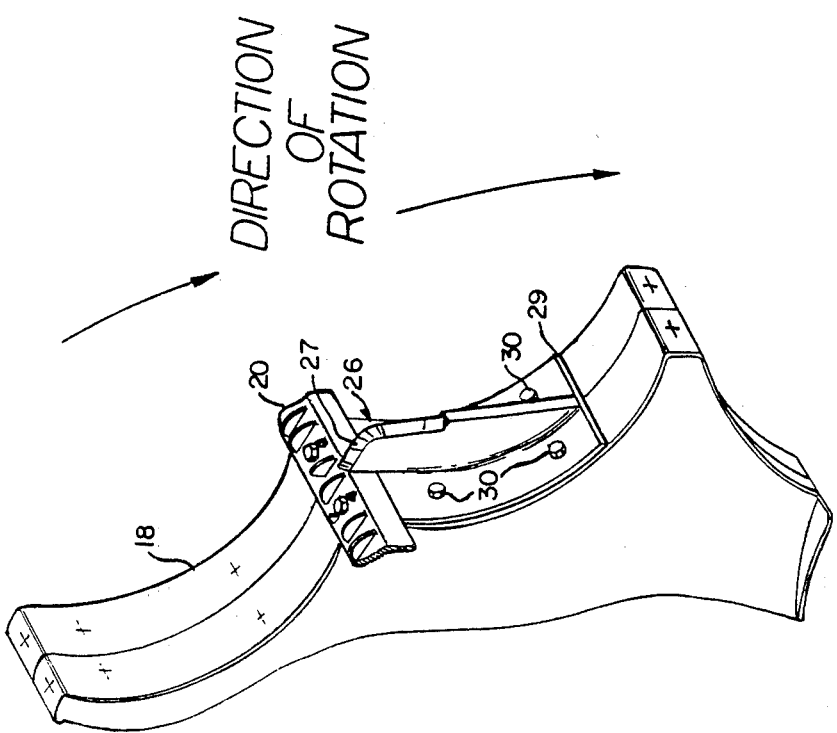
FIG. 3A is a diagrammatic view of the threshing rotor with the cutting means attached.

Threshing assembly 12 is mounted substantially transversely to the longitudinal axis of the combine 10 as best seen in FIG. 2. It comprises a rotor 18 and a cylindrical housing 19 within which the rotor 18 rotates. Rasp bars 20 (FIG. 3A) are mounted intermittently and equidistant about the periphery of rotor 18 and extend substantially across its full width.

Helical guide vanes 21 are mounted on the inside periphery of the upper portion of cylindrical housing 19. The guide vanes 21 on the right hand side of the housing 19 form a right hand helix while the guide vanes 21 on the left hand side of the housing 19 form a left hand helix.

The threshing assembly 12 has a centrally located crop feeding area 17 located below the axis 22 of rotor 18. Exit areas 23 are provided, one on each respective side of the housing 19. Each of the exit areas 23 lead to its respective separator assembly 24. Each separator assembly 24 has a crop exit area 25 located rearwardly therein.

Figure 3B:
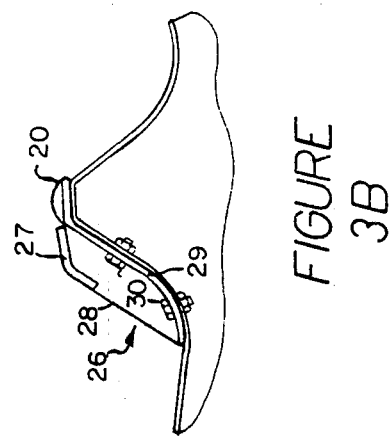
FIG. 3B is a side view of the cutting means of FIG. 3A.
Figure 3C:
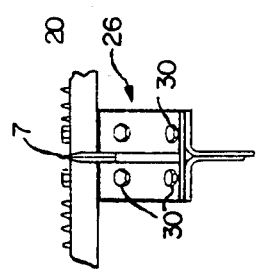
FIG. 3C is a plan view of the cutting means.

Referring to FIG. 3, an enlarged view of the threshing rotor 18 is shown. Threshing rotor 18 rotates in the direction indicated when in operation and has rasp bars 20 (only one of which is shown) mounted substantially equidistant about its periphery, parallel to its longitudinal axis and extending substantially across its entire width.

A series of cutting means or knives are provided, one of which is shown generally at 26. The knife 26 is attached to the rotor 18 in its central portion adjacent each rasp bar 20. The knife 26 has a sharpened edge 27 and a reinforcing support 28. A lower bracket 29 is curved to conform to the shape of the rotor 18 between the rasp bars 20 and has attachment means in the form of bolts 30 attaching the bracket 29 to the rotor 18. The edge 27 is at or near the outside periphery of the rotor 18 and describes an arc substantially contiguously with the arc described by the outside of the rasp bars 20.

OPERATION

In operation, crop is fed via crop pickup 14, table auger 15 and feeder elevator 16 to the crop feeding area 17 of the threshing assembly 12. The crop enters the threshing assembly 12 substantially tangentially to the lower inner surface of the cylindrical housing 19 but it will be realized that the crop is in the form of a thick "mat" as it enters the threshing assembly 12.

As the crop enters the threshing assembly 12, threshing by the rasp bars 20 thresh the crop in cooperation with the concave or lower part of cylindrical housing 19 and the helical guide vanes 21 act to convey crop to each respective side of the threshing assembly 12 when the crop reaches the upper part of the housing 19. At substantially the same time the rasp bars 20 contact the crop, the knives 26 smoothly sever it. When the crop reaches the upper part of the housing, the guide vanes 21 split the crop into one portion which travels to the left under the influence of the left located guide vanes and a second portion which travels to the right under the influence of the right located guide vanes 21 as the crop travels around the periphery of the housing 19. Thus, the crop will not be subject to the counter-opposed tensions of both guide vanes which may act to delay the conveyancing action of the guide vanes and, hence, reduce the quantity of crop which can enter the combine.

After the crop is severed and divided, it passes to each respective side of the threshing assembly 12 wherein it exits at 23 to the two separating assemblies 24 for separation. Crop residue leaves the separating assemblies 24 at exit areas 25.

Accordingly, there has been described a specific embodiment of the invention. Many changes may be made in the apparatus without departing from the scope of the invention which should, therefore, be construed by reference to the accompanying claims.

I claim:

1. A threshing assembly for a combine harvester, said assembly comprising a substantially cylindrical housing, a substantially cylindrical rotor rotatable within said housing, a crop feed area located centrally of said threshing assembly to receive crop, guide means on the upper inside periphery of said housing to guide said crop to respective opposite sides of said threshing assembly, threshing means on said rotor operable to thresh said crop, said threshing means comprising a plurality of rasp bars running continuously for substantially the length of said rotor and parallel to the axis of said rotor, said rasp bars being spaced substantially equidistant and intermittently about the periphery of said rotor, and cutting means centrally located on said rotor adjacent said rasp bars and operable to sever said crop at said crop feed area.

2. A threshing assembly as in claim 1 wherein said guide means are helical guide vanes located on the circumference of the upper inside periphery of said cylindrical housing.

3. A threshing assembly as in claim 2 wherein said cutting means are knives, each of said knives being mounted adjacent each respective rasp bar.

4. A threshing assembly for a combine harvester positioned substantially transverse to the longitudinal axis of said combine and comprising a substantially cylindrical housing, a substantially cylindrical rotor adapted to rotate within said housing, a crop feed means area located in the central portion of said assembly and operable to receive crop, rasp bars located intermittently about the periphery of said rotor, each respective rasp bar extending continuously for substantially the length of and parallel to the axis of said rotor, helical guide vanes mounted on the upper inside circumference of said housing to guide said crop from said central portion to respectively opposed ends of said threshing assembly and cutting means centrally located on said rotor to sever said crop at said central portion of said assembly.

5. A threshing assembly as in claim 4 wherein said cutting means are knives, each of said respective knives being mounted adjacent each of said respective rasp bars.

6. A threshing rotor for a combine harvester, said rotor being substantially cylindrical and operable to rotate within a substantially cylindrical housing, said rotor being mounted substantially transverse to the longitudinal axis of said combine harvester, a plurality of rasp bars mounted on said rotor intermittently about the periphery thereof, each of said rasp bars extending continuously for substantially the length of said rotor and being parallel to the axis thereof, and a plurality of knife means centrally located and mounted on said rotor, each of said knife means being mounted adjacent each of said rasp bars and being operable to sever crop when said crop enters said housing.

* * * * *